MULTIPLE INPUT COUNTER AND METHOD
Filed Sept. 11, 1964
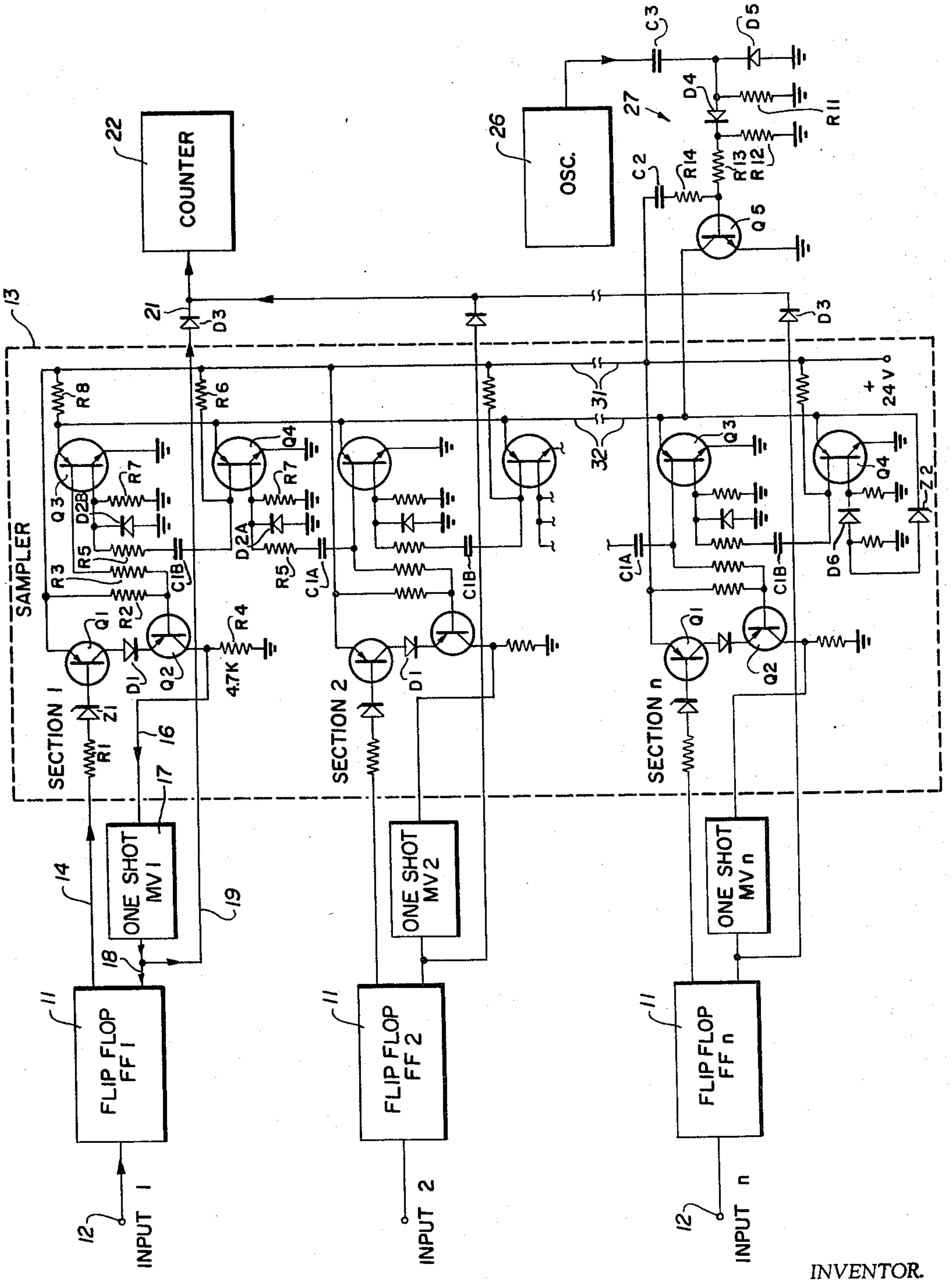
INVENTOR.
Joseph G. Kramasz Jr.
BY Flehr and Swain
Attorneys 3,294,985
Patented Dec. 27, 1966

3,294,985

MULTIPLE INPUT COUNTER AND METHOD

Joseph G. Kramasz, Jr., 3751 Northridge Drive, Concord, Calif. 94520

Filed Sept. 11, 1964, Ser. No. 395,768
8 Claims. (Cl. 307—88.5)

This invention relates to a multiple input counter and the method and more particularly to a multiple input counter and method for combining readings from multiple locations with a readout at a remote location.

Heretofore mechanical devices have been provided for combining the output from a plurality of meters. Such devices have particular serious limitations as to the number of inputs which can be handled and as to the top speed of operation. There is therefore a need for a new and improved multiple input counter and method.

In general it is an object of the present invention to provide a multiple input counter and method which will overcome the above named disadvantages.

Another object of the invention is to provide a multiple input counter and method of the above character which is absolutely accurate.

Another object of the invention is to provide a multiple input counter and method of the above character which will conveniently link together a plurality of meters and which will count correctly even though the input counts may occur at random or simultaneously in separate channels.

Another object of the invention is to provide a multiple input counter and method of the above character in which the readout is provided at a remote location.

Additional objects and features of the invention will appear from the following description in which the preferred embodiment is set forth in detail in conjunction with the accompanying drawing which is a circuit diagram partially in block form of a multiple input counter incorporating the present invention.

As shown in the accompanying drawing, the multiple input counter consists of a plurality of flip-flops 11 and identified as FF–1, FF–2, . . . FF–*n*. The flip-flops are of a conventional type and are bistable devices which have two stable states that are commonly identified as set and reset states. Each of the flip-flops is provided with an input 12 as shown in the drawing. An output of each of the flip-flops 11 is connected to a sampler or interrogator 13, by a conductor 14. The sampler 13 is provided with two stages for each input, i.e. for five separate inputs, the sampler consists of five sections in the form of a ten-stage ring counter. Every second stage of the ten-stage ring counter serves as a dummy stage and provides a delay between sampling of adjacent channels.

Each section of the sampler or interrogator 13 is provided with an output 16 which is connected to a suitable triggering device such as a one-shot multivibrator 17 which are identified as MV–1, MV–2, etc. The one-shot multivibrator supplies a reset signal over a conductor 18 to the associated flip-flop 11. The output of each of the multivibrators is also connected by a conductor 19 to suitable isolating means such as an isolating diode D3. The output of the diode D3 is connected by conductor 21 to the input of a counter 22. The counter 22 can be of any suitable type as hereinafter explained. Means is provided for causing the sampler 13 to operate and consists of an oscillator 26 which is connected by a network 27 to the sampler 13.

Each of the sections of the sampler 13 associated with a flip-flop consists of two transistors Q1 and Q2 and two silicon controlled switches Q3 and Q4. The transistors Q1 and Q2 can be of any suitable type, as for example, they can be type numbers 2N1131 and 2N1307 respectively. The silicon controlled switches Q3 and Q4 can also be of any suitable type such as type number 3N60. Alternatively, Q3 and Q4 can be any combination of two transistors connected so that in combination the two devices Q3 and Q4 exhibit the same characteristics as a silicon controlled switch. The devices Q1, Q2, Q3, and Q4 are connected together as shown in drawings with suitable capacitors, resistors and diodes as hereinafter described.

Operation of the multiple input counter in performing the present method may now be briefly described as follows: Let it be assumed that it is desired to count a number of input pulses and that an input pulse is supplied to input No. 1 to flip-flop FF–1 to cause flip-flop FF–1 to be triggered from its reset condition to its set condition. When this occurs, the output 14 from the flip-flop FF–1 approaches almost ground potential from a positive voltage such as 24 volts shown in the drawing which was on line 14. As the voltage on the line 14 approaches zero, the Zener diode Z–1 breaks down and permits the current from the positive 24 volt line 31 to pass through the emitter of the transistor Q1 to the base of the transistor through the Zener diode Z–1 and through the current limiting resistor R1 to the flip-flop FF–1 to thereby provide a positive base drive for the transistor Q1 so that it will stay on as long as the flip-flop FF–1 is in the flipped or set condition.

If input signals are received on the other inputs to the other flip-flops 11, the transistor Q1 of each section which has received an input pulse will be turned on.

The oscillator 26 can be of any suitable type such as an RC relaxation oscillator which has a frequency of oscillation which must be $2n$ times the maximum repetition rate of the fastest or highest input rate to any one of the flip-flops where $n$ is the number of sections in the sampler and $2n$ is the number of silicon controlled switches in the sampler. By way of example, the oscillator can operate at a suitable frequency such as 200 kc. This frequency is supplied through the coupling and D.C. blocking capacitors C3. The negative going portion of the output of the oscillator 26 is bypassed by the diode D5. The positive going portion is passed by the diode D4 through the surge limiting resistor R13 to the base of the transistor Q5. The resistor R11 serves as a charge stabilization resistor. The resistor R2 serves to provide a leakage path from the base of the transistor Q5 to ground. As the capacitor C2 is charged through the resistor R13, the transistor Q5 is turned on for a period of time determined by the time constant of the RC network consisting of the capacitor C2 and the resistor R14. Turning on of the transistor Q5 causes the transistor to conduct and causes the line 32 to which it is connected to be grounded for a predetermined period of time until it can begin going back up toward positive 24 volts through the resistor R8. The line 32 does not return to a positive 24 volts because the Zener diode Z2 breaks down at a substantially lower voltage such as at approximately seven volts to start the sampler or interrogator at the starting point and preventing two or more silicon controlled switches from turning on at the same time.

After line 32 is temporarily grounded and begins returning toward the line 31 potential, the Zener diode Z2 of section $n$ breaks down and turns on silicon controlled switch Q4 of section $n$ which will stay on until it receives another pulse from the oscillator 26. Then the anode gate of the silicon controlled switch Q3 will be placed at substantially ground potential and for that reason current will flow through the resistors R2 and R3 of section $n$. When the silicon controlled switch is in the on condition, all elements of the device are at substantially the same potential. The only difference in potential is the ohmic drop. This places a less positive bias on the transistor Q2 and to thereby actually bias the base of the transistor Q2 so that it is negative with respect to the positive 24 volts on its emitter supplied through the diode D1 from the transistor Q1 which is turned on. Since the emitter of the transistor Q2 is positive and the base of the transistor Q2 is somewhat less positive or negative with respect to it, the transistor Q2 is also turned on and remains on until flip-flop FF1 is reset and turns off transistor Q1 or transistor Q2 is turned off by oscillator 26 causing the sampler 13 to advance to the next section. A pulse of current is developed when the transistor Q2 is turned on which passes through the resistor R4 to ground.

Stated in another way, when the counter is just turned on, line 31 goes upward toward plus 24 volts D.C. as the power supply becomes operational. This potential appears at the anodes of all Q3's and Q4's through resistor R8. It appears at the anode gates of Q4's through the R6's. The Q3's and Q4's are not turned on because they have no cathode gate drive except for the Q4 of section *n*. It appears at the anode gate of each Q3 through the series combination of resistors R2 and R3 of each section. This potential appears on line 32 through R8 and thus on the cathode of Zener diode Z2 which breaks down at approximately seven volts as pointed out above thus conducting current through R8, Z2, through the diode D6, into the cathode gate of Q4 in section *n*. Q4 is thus turned on and saturates. Current flow is into the anode through R8 lowering the voltage on line 32 to the saturation voltage of the silicon controlled switch Q4 which is typically about one volt thereby cutting off Z2. Current also flows through resistor R6 of section *n* into the anode gate of Q4 of section *n*. The voltage on the anode gate becomes about one volt. A silicon controlled switch has the property of staying in the saturated condition until current is interrupted in the anode.

The oscillator 26 also begins running after the counter is turned on and delivers pulses to the base of transistor Q5. Each time a pulse arrives at the base of Q5 it drives Q5 into saturation and thus lowers the collector of Q5 which is connected to line 32 to the saturation voltage of Q5 which is typically approximately .2 volt. The current normally going through Q4 is diverted to the collector of Q5 thus turning off Q4. The anode gate of Q4 goes toward the 24 volt positive potential of line 31 since no current is now flowing into the anode gate. Displacement current in capacitor C1B of section *n* as a result of the rising potential on the anode gate of Q4 flows through R5 of section *n* into the cathode gate of Q3 of section *n*. Q3 is thus turned on and into saturation.

Before the displacement current stops flowing, Q5 is turned off due to the end of the oscillator pulse. The potential of line 32 begins to rise, but since Q3 is still being driven by the displacement current of C1B it does not get higher than about one volt positive and Q3 of section *n* is locked up in the "on" condition.

The anode gate of Q3 of section *n* which had been at the power supply potential of 24 volts now drops to about one volt and capacitor C1A discharges from ground through D2A, and partially through R7 in parallel, in series with R5, all of section *n*–1, and the anode gate of Q3 of section *n* back to ground. This discharges C1A of section *n* and makes it ready to turn on Q4 of section *n*–1 when Q3 of section *n* turns off.

The next pulse from oscillator 26 drives Q5 into saturation during the pulse. Q5 forms a lower impedance path for the current flow from the 24 volt source so that there is insufficient current flow to serve as a holding current for Q3 and Q3 turns off and its anode gate goes positive in potential. The displacement current path now is from line 31 through R2 and R3, into capacitor C1A, all of section *n*, and through R5 of section *n*–1 into the cathode gate of Q4 of section *n*–1.

Again, before the displacement current stops flowing, Q5 is turned off and line 32 is allowed to rise in potential. It only rises to about one volt before Q4 of section *n*–1 turns on due to the displacement current of C1A of section *n* driving the cathode gate on.

The discharge path of C1B of section *n*–1 (which had been charged when Q4 was off) is from ground through D2 and R5 associated with Q3 in section *n*–1 into C1B and into the anode gate of Q4 back to ground.

In a similar manner, each silicon controlled switch is turned on and off in sequence starting with Q4 of section *n*, proceeding to Q3 of section *n*, then Q4 of section *n*–1, Q3 of section *n*–1, Q4 of section *n*–2, etc., until Q3 of section 1 is turned off. Since there is no C1A associated with the anode gate of Q3 of section 1 there is no Q4 to be turned on next. The potential of line 32 then proceds past one volt when Q5 is turned off and when the voltage rises to approximately seven volts, Zener diode Z2 of section *n* again breaks down and the process starts all over again.

If a flip-flop (FF) of any section is in the set condition when the Q3 of that same section is on, Q1 of that same section is turned on into saturation by breakdown of Z1 of that same section and Q2 is allowed to conduct by base current flowing through Q1, D1, emitter of Q2 and base of Q2, R5, and anode gate of Q3, all of the same section. A positive pulse thus is produced on line 16 due to Q2 being turned on and into saturation. This pulse of current triggers the one shot multivibrator MV–1. The multivibrator is of a type which produces a pulse which rises to the maximum positive voltage as for example 24 volts and remains there for a predetermined period of time as for example 4 milliseconds and then returns to zero. The positive going portion of the pulse is supplied on the line 19 through the diode D3 to the line 21 and triggers the counter 22.

The negative going portion of the pulse from the one shot multivibrator MV–1 is utilized for resetting the flip-flop FF–1. The negative going portion of the pulse is utilized because it occurs 4 milliseconds later which gives sufficient time to reject any contact bounce in the event the input to the flip-flop FF–1 is made with a mechanical switch closure. Thus, reset does not occur until 4 milliseconds have elapsed after the pulse comes in and therefore this prevents the flip-flop FF–1 from being triggered twice for the same incoming pulse as it might if reset was made immediately after the beginning of an incoming pulse and the switch "bounced" causing a "bounce" to again trigger the flip-flop to a "set" condition. This one "bouncing" switch closure occurring during the sampling time could give several "counts" if reset was not delayed.

If for some reason another input pulse should be supplied to the flip-flop FF–1 before the sampling pulse supplied to the silicon controlled switch Q4 is terminated a count is immediately supplied to the counter 22 because as soon as the flip-flop FF–1 is triggered, the one shot multivibrator MV–1 is triggered because silicon controlled switch Q3 is turned on but transistor Q2 is prepared to turn on since its base is at an intermediate voltage determined by the ratio of resistors R2 and R3. As soon as Q1 is turned on by the flip-flop FF–1 being set, a voltage equal to the supply voltage minus a small drop (about .25 volt) due to the saturation voltage of Q1 and the forward drop of D1 about .7 volt appears at the emitter of Q2 and thus the emitter base junction of Q2 is forward biased and thereby turned on and saturated.

Upon receipt of the next pulse from the oscillator 26, the line 32 is again grounded temporarily thus cutting off the current to the anode of Q3 thereby turning Q3 off. The anode gate of Q3 which had been near ground potential due to current flow in R3, begins to rise toward line 31 potential, the line 32 would go up in potential until it reaches the breakdown voltage of the Zener diode Z2 of section *n* and turns on silicon controlled switch Q4 of section $n$ placing the anode gate of Q4 of section $n$ at near ground potential due to saturation of Q4 with current through resistor R6 of section $n$. Also, C1B of section $n$ discharges (it was charged to 24 volts previously from line 31 through R6, R5, R7 and/or cathode gate to cathode of Q3 all of section $n$) through diode D2B, resistor R5 and anode gate of Q4 to ground, all of section $n$.

Each succeeding stage (Q3 of section $n$, Q4 of section $n-1$, Q3 of section $n-1$, Q4 of section $n-2$ etc.) is turned on in the following manner. As the anode potential drops temporarily to near ground potential, due to an incoming pulse saturating transistor Q5, the silicon controlled switch is turned off which causes the voltage at the anode gate of the same silicon controlled switch to attempt to reach 24 volts. C1B (which has just been discharged) charges back up through R6, R5 and the cathode gate to the cathode of Q3.

On all Q3's the anode gate current path is through R2 and R3. Line 32 has meanwhile begun to recover toward a more positive voltage but C1B is discharging through the cathode gate of Q3 and attempting to turn it on. Since line 32 is no longer grounded, it can furnish drive current to the anode of Q3, thus turning Q3 on into saturation. C1A now is discharged through the anode gate of Q3 of section $n$ and R5 of Q4 of section $n-1$ and diode D2A of Q4 of section $n-1$. Thus, the sampler has moved from Q4 of section $n$ to Q3 of section $n$ and has discharged C1B of Q4 of section $n-1$ making it ready to turn on Q4 of section $n-1$ the next time the line 32 is grounded, thus turning off Q3 of section $n$.

The order of firing starts at Q4 of section $n$, then to Q3 of section $n$. Next is Q4 of section $(n-1)$ and then Q3 of $(n-1)$ and so forth. Thus it can be seen that the silicon controlled switch Q3 is a sampling device and serves to interrogate to determine whether or not a positive potential is on the emitter of the transistor Q2 and if there is such a positive potential, a count is supplied to the counter 22. If the emitter is not positive, then the associated flip-flop has not been triggered and no count will be supplied to the counter 22.

Each of the $n$ sections has two silicon controlled switches Q3 and Q4, only one of which is on at any one time. Q4 does not have an associated transistor base in its anode gate circuit, and thus does no sampling. Q3 of the same circuit does have a transistor base of Q2 of the same section in its anode gate circuit. Both Q3 and Q4 of each section are on for the same period of time (equal to the reciprocal of oscillator 26 frequency), but actual sampling occurs only when Q3 is on. Thus, half the time of any long interval of time is spent in sampling and half is spent in time delay. The time delay is interposed betwene two successive sampling times to prevent counts in adjacent channels from appearing at the counter too close together and appearing to the counter as one pulse rather than two separate pulses. The fastest two pulses can arrive is the reciprocal of the oscillator 26 frequency.

It can be seen that the silicon controlled switch Q4 provided in each section serves the sole function of providing a time delay. The time delay provided by the silicon controlled switch Q4 and each section is advantageous. This time delay has reference to the sampling or interrogating pulses supplied by the oscillator 26. Thus it can be seen that the sampling is only occuring one-half of the time and that there is no sampling during the other half of the time which permits the counter to recover before the next incoming pulse arrives. If it were not for the delay interposed by each of the silicon controlled switches Q4, it would be possible for the counter 22 to receive two pulses within a very short time, i.e. within such a short period of time that the counter could not determine whether one or two pulses arrived. This is accomplished by the silicon controlled switches Q4 which provide a predetermined time delay which is the reciprocal of the frequency of oscillator 26. Thus for an oscillator frequency of 200 kc. a time delay of 5 microseconds would be provided between the two adjacent pulses supplied to the counter 22. Therefore, two pulses cannot be supplied to the counter 22 from two channels any faster than the time delay provided by the silicon controlled switches Q4.

From the foregoing, it can be seen that the sampler 13 in conjunction with the oscillator 26 causes each of the silicon controlled switches Q3 and Q4 in all of the sections to be turned on one at a time. When one is turning off, it turns on the next one. The silicon controlled switches are turned on in sequence and turned off in the same order. When five inputs are being utilized, requiring use of ten silicon controlled switches, the silicon controlled switches are turned on in succession and are turned off in succession. If additional pulses arrive, the same sequence is repeated.

With reference to the silicon controlled switches Q3 and Q4 it should be pointed out that the diodes D2A and D2B serve to bypass the negative going portion of the signal to ground and provide a discharge path for C1A and C1B, respectively. The resistor R7 serves to develop a signal across it and provides a leakage path from cathode gate to ground. Diode D3 is an isolating diode which prevents a pulse from another section from entering the flip-flop or multivibrator of the associated section.

It is apparent from the foregoing that there has been provided new and approved multiple input counter and method. A number of readings can be combined to provide a readout at a single remote location. The count will be exactly accurate even though the counts may occur at random or may occur exactly simultaneously in separate channels.

The counter 22 can be of any suitable type such as a combination mechanical counter and a combination electronic counter which provides a readout on a suitable readout means such as the nixie tube. Inputs to the multiple input counter may be by electrical pulses or switch closures.

In the multiple input counter, the time delay between successive channels or sections prevents counts stored in the sections from appearing as a single pulse at the counter. Absolute accuracy is obtained by the one shot circuitry which only resets the flip-flop if the pulse arrives in adequate time to cause the positive trigger in the event the count should occur during the time the specific channel is being sampled.

I claim:

1. In a counter for counting a plurality of input signals, a plurality of bistable devices capable of assuming first and second stable states, means connecting one of the input signals to each of the bistable devices so that an input signal causes the bistable device to shift from its first stable state to its second stable state, sampling means operating in a continuous manner for determining which of said bistable devices has shifted from its first stable state to its second stable state, a signal generating device for each of said bistable devices, means connecting the sampling means to each of the signal generating devices so that the one, signal generating device for one of the bistable devices generates a signal when the sampling means determines that said one, bistable device is in its second stable state, means forming connections between the signal generating devices and the bistable devices so that the signal from said one generating device resets said one bistable device, a counting device, means connecting the signal generating devices to the counting device so that each signal from a signal generating device registers a count in the counting device.

2. A counter as in claim 1 wherein each of said signal generating devices includes means for generating a signal of a type so that there is a predetermined time delay between the time that the counting device registers a signal and the time at which said one bistable device is reset.

3. A counter as in claim 1 wherein said sampling means samples said bistable devices sequentially and wherein the sampling means includes means for providing a predetermined time delay before each succeeding bistable device is interrogated.

4. In a counter for counting a plurality of input signals, a plurality of bistable devices capable of assuming first and second stable states, means connecting one of the input signals to each of the bistable devices so that an input signal causes a device to shift from its first stable to its second stable state, interrogating means connected to said bistable devices, an oscillator having a predetermined frequency connected to said interrogating means, said oscillator causing said inerrogating means to interrogate said bistable devices in sequence to determine which of said bistable devices have assumed said second stable state, a one shot trigger circuit for each of said bistable devices and connected to said interrogating means, said interrogating means including means for supplying a signal to one of, the one shot trigger circuits when the interrogating means determines that one of the bistable devices is in its second stable state, means connecting the one shot trigger circuits to the bistable devices so that said one bistable device is reset when a signal is received from the interrogating means by said one shot trigger circuit, a counting device, and means connecting the one shot trigger circuit to supply a signal to the counting device when the interrogating means supplies a signal to the one shot trigger circuit.

5. A counter as in claim 4 wherein said interrogating means includes a section for each bistable device each section comprising first and second transistors and first and second switching devices means connecting the first transistor of one section to one of said bistable devices to cause the first transistor to assume one condition when said one bistable device assumes its second stable state, means connecting the first transistor of said one section to the second transistor of said one section, means connecting the oscillator to the first and second switching devices of said one section, means connecting the first switching device of said one section to the second transistor of said one section, said first switching device of said one section being switched on by said oscillator and causing said second transistor of said one section to be turned on when the first transistor of said one section has been turned on, said second switching device of said one section being switched on by said oscillator and serving to provide an interval of time to permit the counting device to recover after it has received a signal and means for supplying a signal to the one shot trigger circuit when the second transistor is turned on.

6. A counting device as in claim 5 wherein each of the one shot trigger circuits produces a signal having a one polarity portion and an opposite polarity separated by an interval of time and in which one of the polarity portions is utilized for actuating the counting device and in which the other of the polarity portions is utilized for resetting the bistable device.

7. In a counter for counting a plurality of input signals, a plurality of bistable devices capable of assuming first and second stable states, means connecting one of the input signals to each of the bistable devices so that an input signal causes the bistable device to shift from its first stable state to its second stable state, sampling means for determining which of said bistable devices is shifted from its first stable state to its second stable state, a signal generating device for each of said bistable devices, means connecting the sampling means to each of the signal generating devices so that the one signal generating device for one of the bistable devices generates a signal when the sampling means determines that said one bistable device is in its second stable state, means forming connections between the signal generating devices and the bistable devices so that the signal from said one signal generating device resets said one bistable device, a counting device and means connecting the signal generating devices to the counting device so that each signal from a signal generating device registers a count in the counting device, said sampling means including an oscillator having a predetermined output frequency, first and second switching devices connected to each bistable device and means connecting the output of the oscillator to the switching devices so that said switching devices are triggered in sequence.

8. A counter as in claim 7 wherein said sampling means includes first and second transistors for each bistable device, the first transistor for a bistable device being turned on when the same bistable device is shifted from its first to its second stable state and supplying a voltage to the second transistor for the same bistable device and means connecting the second transistor to the first switching device for the same bistable device.

References Cited by the Examiner

UNITED STATES PATENTS

| | | | |
|---|---|---|---|
| 2,978,174 | 4/1961 | Dean et al. | 307—88.5 |
| 3,113,273 | 12/1963 | Tendick | 328—75 X |

ARTHUR GAUSS, *Primary Examiner.*

J. ZAZWORSKY, *Assistant Examiner.*